(12) United States Patent
Seibt (10) Patent No.: US 8,769,731 B2
(45) Date of Patent: Jul. 8, 2014

(54) FLUSHING DEVICE AND FLUSHING METHOD FOR A VACUUM TOILET

(75) Inventor: Christian Seibt, Buchholz (DE)

(73) Assignee: Airbus Operations GmbH (DE)

( * ) Notice: Subject to any disclaimer, the term of this patent is extended or adjusted under 35 U.S.C. 154(b) by 1353 days.

(21) Appl. No.: 12/077,593

(22) Filed: Mar. 20, 2008

(65) Prior Publication Data

US 2008/0237397 A1  Oct. 2, 2008

Related U.S. Application Data

(60) Provisional application No. 60/919,760, filed on Mar. 23, 2007.

(30) Foreign Application Priority Data

Mar. 23, 2007  (DE) .......................... 10 2007 013 949

(51) Int. Cl.
*E03D 11/00* (2006.01)

(52) U.S. Cl.
USPC ...................................... 4/431; 4/432; 4/434

(58) Field of Classification Search
USPC ............. 4/431, 432, 433, 434, 316, 216, 328, 4/348, 353, 420
See application file for complete search history.

(56) References Cited

U.S. PATENT DOCUMENTS

| | | | | |
|---|---|---|---|---|
| 2,156,108 A * | 4/1939 | Brain | ............................... | 4/421 |
| 4,376,314 A * | 3/1983 | Iwans | ............................... | 4/431 |
| 5,109,551 A * | 5/1992 | Lecat | ............................... | 4/431 |
| 6,415,457 B2 * | 7/2002 | Schmucki | ........................ | 4/420 |
| 6,977,005 B2 * | 12/2005 | Erdmann et al. | ................ | 55/431 |
| 2002/0112281 A1 | 8/2002 | Erdmann et al. | | |
| 2006/0288472 A1 | 12/2006 | Pondelick | | |

* cited by examiner

*Primary Examiner* — Gregory Huson
*Assistant Examiner* — Lauren Heitzer
(74) *Attorney, Agent, or Firm* — Lerner, David, Littenberg, Krumholz & Mentlik, LLP (57) ABSTRACT

A vacuum toilet and a method for operating a vacuum toilet, wherein generating negative pressure to remove solids by suction is also used for generating a desired flushing medium flow. To this effect, if necessary, guiding devices are used which influence a flow upstream of a nozzle outlet and downstream of a nozzle outlet such that flow optimization of the flushing medium can be carried out.

14 Claims, 5 Drawing Sheets

FLUSHING DEVICE AND FLUSHING METHOD FOR A VACUUM TOILET

CROSS-REFERENCE TO RELATED APPLICATIONS

This application claims the benefit of the filing date of U.S. Provisional Patent Application No. 60/919,760 filed Mar. 23, 2007, the disclosure of which is hereby incorporated herein by reference.

BACKGROUND OF THE INVENTION

The invention relates to a vacuum toilet with a flushing system and to a method for operating the vacuum toilet with the flushing system, in particular a vacuum toilet with a flushing system for aircraft, and corresponding aircraft.

In known flushing devices for a vacuum toilet, after use of the toilet, triggering of a flushing process is required by activation of a triggering device. This is first followed by the supply of flushing liquid to the toilet and subsequently by the opening of a suction valve in order to transport the liquids and solids to the region of a waste water tank. In this arrangement the transport process usually takes place by a pressure differential between the waste water tank and the place of installation of the toilet. During the flushing process, conventional systems for flushing a vacuum toilet are associated with considerable noise emission due to the airflow caused during the flushing process, which noise emission can be still further amplified by the funnel effect of the toilet bowl.

From US 2006/0288472 a vacuum toilet is known in which water enters a toilet bowl at the upper rim, and the top lateral margin region comprises openings. During the suction process the lid is closed so that during suction air is sucked in through the openings, wherein the air mixes with the water.

SUMMARY OF THE INVENTION

There may be a need to provide a vacuum toilet with a flushing system as well as a method for flushing a vacuum toilet so that the noise emission caused during a flushing process is reduced and the cleaning effect in the toilet bowl is ensured.

According to an exemplary embodiment, a vacuum toilet is provided with a first volume comprising a first opening for supplying a medium to be disposed of, wherein the first opening can be closed off in a negative-pressure-proof manner, and comprising a second opening, to which a negative-pressure-generating device can be connected, for removing the medium to be disposed of; a second volume that comprises a reservoir for a flushing medium; and a nozzle arrangement with a nozzle that comprises a nozzle outlet, wherein the nozzle arrangement connects the second volume to the first volume such that the nozzle outlet is directed to the first volume, and the flushing medium, by a pressure differential between the first volume and the second volume, through the nozzle reaches the first volume from the second volume in a directional manner, wherein the pressure differential is caused by negative pressure generated in the first volume.

With such a vacuum toilet a flushing medium can be injected into the toilet, wherein the pressure required for injection is not achieved solely by pressurising a reservoir for a flushing medium, as is the case in conventional systems, but instead by generating negative pressure on the side on which a flushing medium exits from an injection nozzle. In other words, while a pressure differential is still created, in the present case this now takes place by evacuating a toilet bowl region from which the contents including the waste water are sucked off anyway. In this way evacuation results not only in the process of removal by suction but also in the provision of a pressure differential that is necessary for the proper functioning of a nozzle for a flushing medium.

According to an exemplary embodiment, the first volume comprises an interior wall with a curvature that is at least in part concave, and the nozzle outlet is aligned such that the flow of the flushing medium travels along the concave curvature.

In this way the flow of a flushing medium emanating from the nozzle outlet can be kept over a long distance in a laminar manner on the interior surface of a toilet bowl. Due to its high-energy nature, this laminar flow provides a good cleaning effect.

According to an exemplary embodiment, the vacuum toilet comprises a guiding device for guiding the flushing medium, which guiding device is arranged such that it displaces the turbulence of the flow of the flushing medium away from the nozzle outlet so that the flow remains laminar for longer.

By a guiding device for a flushing medium, the flushing medium, for example flushing water, flushing air or a mixture of flushing water and flushing air, can be stabilized. In this arrangement a boundary layer can be stabilized by blowing guiding air into the boundary layer, and the surface transport in the toilet bowl can be further improved. In particular the guiding air can also be obtained from a reservoir for flushing air. The guiding air, by which the flow of the flushing medium is subjected such that the flushing medium is guided by the air blown in this process, introduces further energy into the flow of the flushing medium so that detachment of the flow from the interior wall can be avoided. If the flow becomes detached from the interior wall, then this flow can no longer clean the interior wall. By extending the lower end of the flushing nozzle by a guiding device, air mass vortices can be further reduced.

According to an exemplary embodiment, the second volume comprises a reservoir for a gaseous flushing medium and a reservoir for a liquid flushing medium.

Providing a reservoir for a gaseous flushing medium makes it possible to use a light flushing medium, in particular if the gaseous flushing medium can be obtained from the surroundings of the vacuum toilet. The use of, for example, air reduces the extent of, for example, water, which would have to be used as an alternative as a flushing medium. Providing a reservoir for a liquid flushing medium such as, for example, water, in some cases improves the cleaning effect because water is frequently used for rendering dirt particles heavy and for solubilising them. The provision of reservoirs both for a gaseous and for a liquid flushing medium makes it possible to optimise the cleaning process.

According to an exemplary embodiment, the guiding device is designed to guide a gaseous flushing medium around the reservoir for a liquid flushing medium.

By a guiding device, for example in the form of a flow-optimized shell, the noise level during the flushing process can be reduced and the flow energy in the flushing air can be increased. The flushing nozzle concentrates the flow energy on the toilet bowl surface and optimizes the surface transport.

According to an exemplary embodiment, the vacuum toilet comprises a separation device that is designed to separate a gaseous flushing medium, which is supplied from the reservoir for a gaseous flushing medium, into a first partial quantity and a second partial quantity, wherein the liquid flushing medium is added to the first partial quantity.

In this way the supplied gaseous flushing medium of the volume of the first partial quantity can be used both for mixing a fluid comprising gaseous and liquid components, and of the volume of the second partial quantity can be used for feeding into a guiding device or a guiding channel in order to, with this part of the flushing air, provide guiding air that is used to blow the fluid in order to displace turbulence away from the nozzle outlet.

According to an exemplary embodiment, the first partial quantity leaves the nozzle arrangement closer to the interior wall of the first volume than does the second partial quantity.

The first partial quantity can be mixed with a flushing liquid. On one side the flushing flow is channeled, for example, through the curved interior wall of the toilet bowl and can be prevented from detaching from the wall by being blown along by the second partial quantity which leaves the nozzle arrangement further away from the interior wall, but which is directed at a certain angle onto the flushing flow so as to keep said flushing flow laminar in a stable manner.

According to an exemplary embodiment, the guiding device is designed to guide the second partial quantity of a gaseous flushing medium.

In this arrangement the second partial quantity of the gaseous flushing medium can be guided by the guiding device so that the guiding device guides not only the entire quantity of flushing air supplied in front of the nozzle arrangement in the second volume, but also the partial quantity that is used for the stabilising blowing-along of the flushing flow.

According to an exemplary embodiment, the second volume comprises an opening to the surroundings of the vacuum toilet.

The reservoir for a gaseous flushing medium can thus be filled from a supply, which is available so as to be practically unlimited, of, for example, ambient air, which as a rule takes place by the simple inflow of air through the openings into the second volume.

According to an exemplary embodiment, an interior wall of the first volume comprises an anti-adhesive or hydrophobic surface.

With the use of an anti-adhesive surface the toilet can be operated as a waterless toilet. A hydrophobic surface prevents mostly liquid solids components from adhering to it so that the flushing medium no longer has to overcome the adhesive force of the dirt particles. In this arrangement the surface can be correspondingly coated or can have undergone surface treatment, or it can already be produced from a corresponding material.

According to an exemplary embodiment, the vacuum toilet comprises a lid that is movable between a first position and a second position, wherein the lid in the first position seals off the first volume in a negative-pressure-proof manner and in the second position releases the first volume in order to feed in a medium to be disposed of.

In this arrangement the lid can be used not only to minimise noise, but also in order to ensure the negative-pressure-proof seal that is necessary for proper functioning. However, for the obvious use of the toilet, the lid also has to free the upper opening of the toilet bowl.

According to an exemplary embodiment, the nozzle is a slit nozzle that at least in part extends so as to be essentially parallel to the first opening.

A slit nozzle can pre-form a jet of a flushing medium already at the time of emanating from the nozzle outlet and can define a direction and spread. Arranging a ring nozzle parallel, i.e. at an essentially constant distance from the first upper opening, makes it possible to obtain an even flow and thus an even cleaning effect. In this arrangement it may be necessary to support a ring nozzle at regular spacing laterally on the outlet so as to keep the spacing of the slits constant.

According to an exemplary embodiment, the vacuum toilet comprises a first valve that releases the second opening to a device that generates negative pressure, a second valve that releases a liquid flushing medium, and a control device that is designed to control a time sequence of controlling the first valve and the second valve.

Coordination of valve control makes it possible to further optimise the cleaning effect with a view to the necessary minimum quantity of flushing liquid. Changing the duration of opening and the points in time of opening can take place on the basis of the degree of soiling detected by a sensor arrangement.

According to an exemplary embodiment, a method for operating a vacuum toilet comprises negative-pressure-proof sealing of a first volume after feeding-in a medium to be disposed of; generating negative pressure in the first volume to remove, by suction, the medium to be disposed of, and to generate a pressure differential between the first volume and a second volume; letting in a flushing medium from the second volume, by the negative pressure generated in the first volume, into the first volume by a nozzle that connects the second volume to the first volume, with a nozzle outlet that is directed into the first volume; and removing, by suction, the medium to be disposed of.

According to an exemplary embodiment, an aircraft with a vacuum toilet according to the invention is provided.

As a result of the above-mentioned measures user comfort is improved by reduced noise emissions, and hygiene is improved by better cleaning of the toilet bowl. Furthermore, with the same cleaning effect, weight can be saved, or with the same quantity of a flushing liquid the cleaning effect can be improved.

It should be noted that the term "vacuum toilet" also refers to a vacuum urinal or a vacuum bidet. Of course, an arrangement according to the invention can also be used as a wash basin or generally as a disposal device, for example a device for the disposal of general waste, for example galley waste in aircraft.

It should be noted that the embodiments, described below, of the invention equally relate to the device, the method and the aircraft.

The individual features can also be combined.

The above-described and further aspects of the present invention are explained and clarified with reference to the enclosed exemplary embodiments.

BRIEF DESCRIPTION OF THE DRAWINGS

Below, exemplary embodiments are described with reference to the following drawings.

DETAILED DESCRIPTION

Below, a preferred exemplary embodiment of the invention is described with reference to the enclosed drawing.

Figure 1:
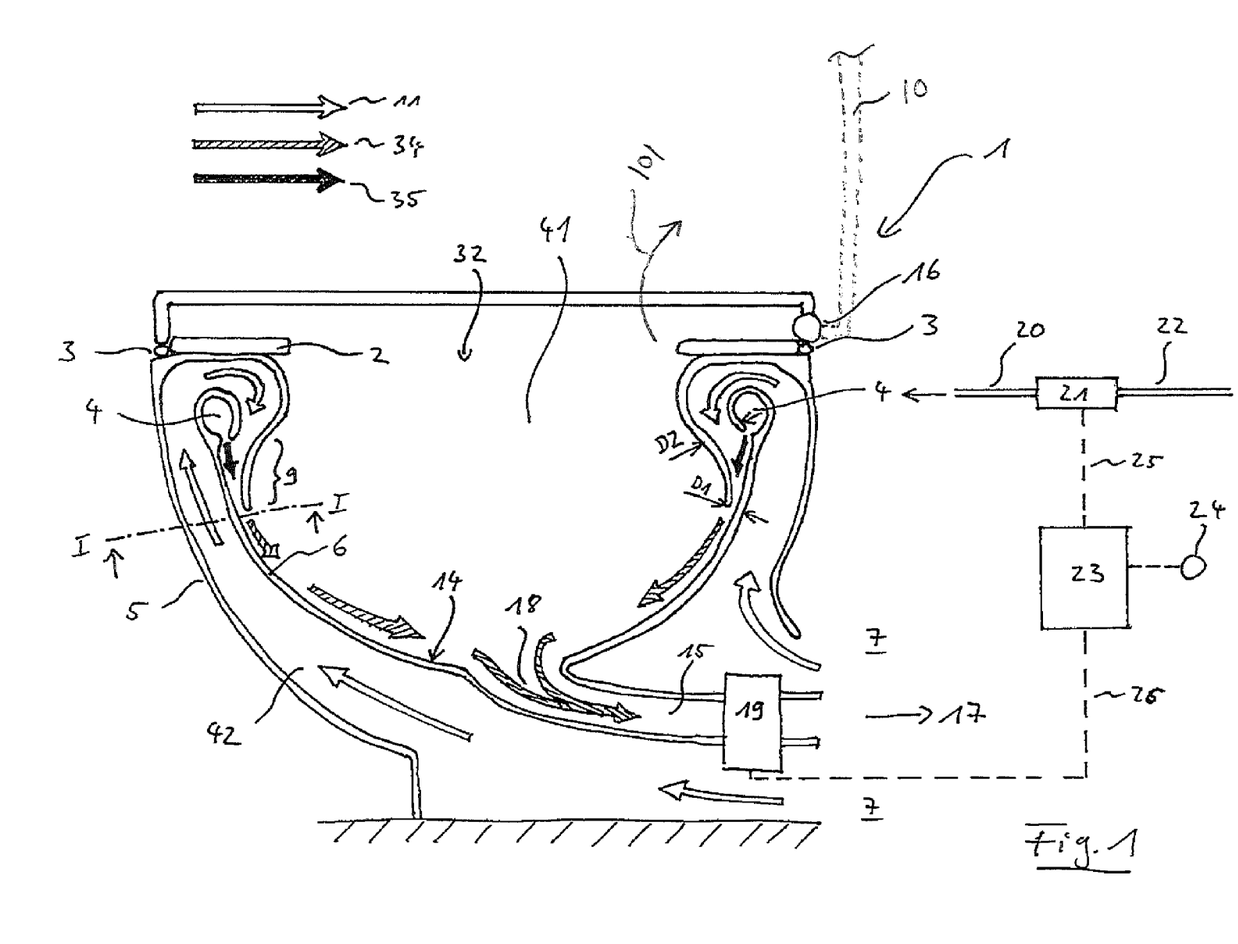
FIG. 1 shows a section view of an exemplary embodiment of the vacuum toilet according to the invention.

FIG. 1 shows a section view of an exemplary embodiment of the vacuum toilet 1 according to the invention. This section view not only illustrates the individual components of the vacuum toilet 1, but also the flow patterns of the flushing medium 11, 34, 35.

It should be noted that the term "liquid flushing medium" 35 can, for example, refer to water, and also to any other liquid that is suitable for flushing. Likewise, the term "gaseous flushing medium" 11 can, for example, refer to air, and also to any other gas or gas mixture that is suitable for flushing. The use of the terms "water" or "air" in the context of the description is thus merely exemplary; it should not in any way be interpreted as having a limiting effect; the terms in this document are used only to describe the subject of the invention in a way that is easier to understand.

A completely gas-proof toilet lid 10 is a prerequisite for proper functioning of the vacuum toilet 1. In this arrangement the toilet lid seals the environment 7 of the vacuum toilet 1 from the negative pressure present in a first volume 41, wherein the first volume 41, for example, is essentially formed by the interior of a toilet bowl 6, a shell 5 and the toilet lid 10 that seals off the toilet bowl 6. As a result of the sealed toilet lid 10, in the case of negative pressure present in the first volume 41 a flushing medium 11, 34, 35, for example in the form of flushing air 11, flushing liquid 35 or a mixture 34 thereof, can be sucked in behind a toilet bowl shell 5 that acts as a second volume 42, and subsequently can be injected into the first volume 41 through a nozzle 13. The toilet lid seal 3 can be located between the toilet lid 10 and a seal edge of the first volume 41. However, it is also possible to provide a separate seal between the toilet lid 10 and the toilet seat 2, as well as between the toilet seat 2 and the first volume 41. In FIG. 1 the seal is in place between the lid 10 and the shell 5. In this arrangement the lid 10 can be held so as to pivot on a pivot axis 16. The arrow 101 illustrates the direction of pivoting of the lid 10 about the pivot axis 16 and further illustrates in dashed line, the second position, i.e., the open position, of the lid 10.

Furthermore, during the process of removal by suction, the suction of secondary air should be minimised by additional openings in the toilet bowl 6 to the first volume 41 in order to prevent drawing in secondary air, which interferes with proper functioning of the vacuum toilet.

The vacuum toilet 1 shown in FIG. 1 comprises a toilet bowl 6 with a reservoir for a liquid flushing medium 4 that can have an opening in the form of a nozzle, for example in the form of a flushing ring or a multitude of flushing nozzles 13. The flushing ring or the flushing nozzle(s) 13 can be arranged in the region of a delimitation, which is at the top in vertical direction, of the toilet bowl 6. A flushing medium 35, for example flushing water, can be delivered by way of a flushing-water supply line 22, a flushing line 20 and a flush valve 21, to the reservoir for a liquid flushing medium 4 or to the flushing ring or flushing nozzle(s) 13 when the flush valve 21 is opened. In the closed state of the flush valve 21 there is no supply of flushing water to the flushing ring or to the flushing nozzle(s) 13. It should be noted that a reservoir for a liquid flushing medium 4 can be arranged either in front of or behind the flush valve 21 when seen from the nozzle 13, in other words some flushing water can also remain in the flushing ring when the valve 21 is closed.

During the flushing procedure the flush valve 21 is opened and flushing water is sprayed or injected into the toilet bowl 6 by way of a flushing ring or flushing nozzle(s) 13. In this process the flushing water can emanate from the opening of the reservoir 4 for a flushing liquid 35 as a result of pressurization of the line 20, 22, as a result of gravity, or as a result of the negative pressure in the first volume.

The toilet bowl 6 can comprise a drain 18 as a second opening, which drain 18 is connected to a drain line 15.

The toilet bowl 6 has a predetermined inclination or curvature in order to transport, as a result of gravity, liquids and solids contained therein in the direction of the drain 18.

After the drain 18 the matter to be transported reaches a suction valve 19 that is connected to a vacuum system 17 which can generate negative pressure or a vacuum so that there is negative pressure in the waste water line 15 upstream of the valve. The suction valve 19 can be opened and closed and in the open state causes a suction flow in the toilet-bowl drain line 15 and thus negative pressure in the closed first volume 41.

As shown by the dashed lines in FIG. 1, the suction valve 19 is controlled by way of a control line 26, and the flush valve 21 is controlled by way of a control line 25 by a control unit 23. The control unit 23 is connected to a triggering device 24, which according to the preferred exemplary embodiment is an operating button that can be activated by a user of the vacuum toilet in order to activate the control unit 23 when the button has been pressed, thus triggering the flushing procedure. As an alternative, the flushing process can be triggered automatically by a corresponding sensor arrangement.

The control unit 23 specifies switching-on times for the flush valve 21 and for the suction valve 19. According to an exemplary embodiment, first the flush valve 21 opens, which results in flushing water being channeled into the toilet bowl 6 and any soiling in the toilet bowl 6 being transported, by way of the drain 18, to the toilet-bowl drain line or waste water line 15. After flushing with water, or with some overlap in time to flushing with water, the suction valve 19 is opened, as a result of which any substances that have collected in the region of the toilet bowl 6 and the toilet-bowl drain line 15 (liquids and solids) are led to the waste water line 15 and onward into the vacuum system 17 as a result of a pressure differential generated by the vacuum system 17.

These cleaning processes and transport processes can involve pure air flushing as a result of opening the suction valve; they can involve water flushing as a result of opening the flush valve; or they can involve air flushing and water flushing at the same time.

In order to minimise the period of time of noise emission and in order to ensure an adequate cleaning function, it is possible, for example, to provide a switching-on duration of approximately one second for the suction valve 19 and a switching-on duration of approximately three seconds for the flush valve 24.

The flushing air 11 and the flushing water 35 can be fed to the toilet bowl 6 by way of a nozzle arrangement 9 in order to improve surface cleaning of the toilet bowl. The geometry of the nozzle arrangement 9 should be designed such that, for effective transport, the hydrodynamic boundary layer on the toilet bowl surface is covered by as laminar a flow as possible right to the drain 18. In this arrangement the nozzle arrangement can, for example, be a flushing nozzle 13 in the form of a ring nozzle or slit nozzle. The transport of solids and liquids is achieved by way of the shearing force whose directional vector acts parallel to the surface of the toilet bowl.

In this application the flushing nozzle 13 generates a flow into the free surroundings and is only limited by the toilet bowl wall. Because the flushing medium 11, 34, 35, for example in the form of a fluid 34 comprising a mixture of flushing water and flushing air, which flushing medium 11, 34, 35 flows from the flushing nozzle 13, has a different speed than the air from the toilet bowl 6, a shear layer arises between them, from which shear layer a free jet develops. The toilet bowl 6 is covered by a flow, and the air from the toilet bowl 6 is sucked in and taken along. The core region of the free jet is dissolved by the sucked-in air from the direction of the rim, over the length of the emanating fluid 34, starting at the outlet 36 of the flushing nozzle 13. From the middle of the jet towards the outside the speed decreases. In order to optimize the surface transport, the flow energy from the flushing nozzle 13 is largely to be used on the toilet bowl surface. For a small Reynolds number the hydrodynamic boundary layer is laminar, and all the components of the boundary layer, of a parallel flow, are aligned in the same direction as the main flow. From a critical value onwards the laminar flow becomes unstable and in the case of external disturbances being present changes to a turbulent flow. Furthermore, the value of the transition to turbulence depends on the geometry of the toilet bowl 6 and on other factors.

The interior 14 of the toilet bowl is curved in a concave manner. The fluids 34 that tangentially flow from the flushing nozzle 13 are deflected on the curvature of the toilet bowl by the resulting directional vector of the fluid flow. This deflection ensures that in the case of an ideal laminar flow the fluid flow 34 is guided predominantly at the boundary layer. In order to ensure ideal transport, the geometry of the toilet bowl 6, in particular the design size and the curvature of the inside 14 of the toilet bowl 6, needs to match the flushing nozzle alignment and the flow speed of the fluid flow.

An even or homogeneous flow distribution can be achieved by central suction removal in the toilet bowl 6 with a central symmetrical drain 18.

Figure 2:
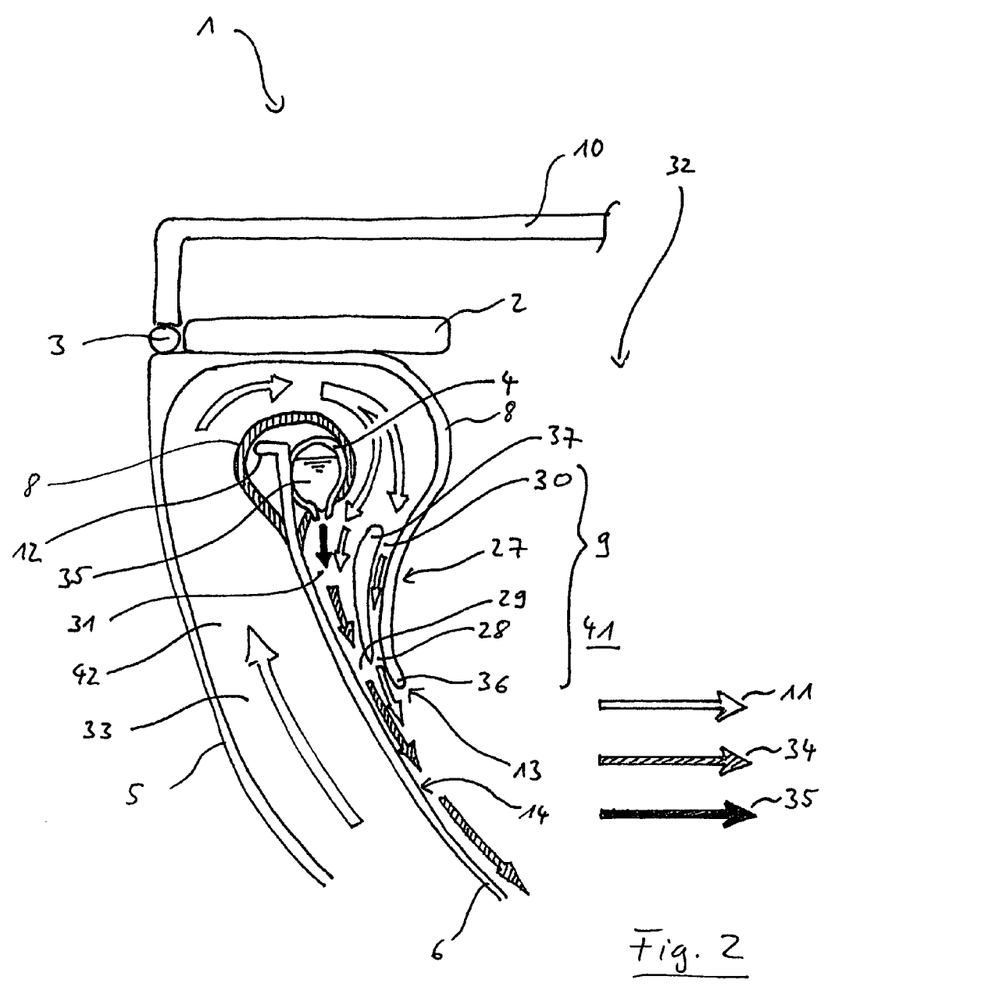
FIG. 2 shows a detailed view of the vacuum toilet shown in FIG. 1.

FIG. 2 shows a detailed view of the nozzle arrangement 9 with the flow-relevant surroundings.

The vacuum toilet 1 can comprise a flushing nozzle 13 with a flushing-air guiding device 27. From a critical value onwards the laminar flow becomes unstable and in the case of small exterior disturbances from the surroundings of the toilet bowl changes to a turbulent flow. Since the molecules of the turbulent flow have more energy, they can more easily follow the toilet bowl contour, but this energy enrichment is reflected in an increase in resistance. After a particular length of travel the flow is no longer able to follow the contour so that it leaves the contour and becomes detached from it. Optimal transport must be achieved along the entire length of travel, from the lower end of the flushing nozzle 36 to the drain 18. Detachment along this length of travel and the changeover of the boundary layer from laminar to turbulent can be further suppressed by a flushing nozzle 13 with a flushing-air guiding device 27. Stabilisation of the boundary layer is achieved in that additionally accelerated air is fed into the boundary layer. This additionally accelerated air can, for example, be separated beforehand from the sucked-in flushing air stream 11, for example by a separation device 37. The flushing air separated in this way can be ejected by way of a guiding channel 30 and a guiding channel outlet 28. Said flushing air introduces additional energy into the boundary layer and in this way stabilises said boundary layer. The boundary layer can rest in a laminar manner against the toilet bowl 6 along a longer distance without becoming detached from it. Furthermore, the negative effect of the flushing nozzle 13 with detachment of the flow at the nozzle outlet 36 is attenuated by the flushing air flow 11 emanating from the guiding channel outlet 28, and can be guided in the direction of the boundary layer. This energy is additionally used for surface cleaning.

By the additional guiding channel 30 the lower end of the flushing nozzle 13, i.e. its outlet 36 is shifted towards the lower end of a nozzle formed by the guiding channel outlet 28 in relation to the flow detachment at the nozzle outlet 36. Ejection of air from the guiding channel 30 into the boundary layer can furthermore be achieved by an extension of the lower end of the flushing nozzle 13 with the guiding device 27. Furthermore, by the extension it is possible to reduce air mass turbulence which can occur when the wet flushing air 34 emanating from the flushing channel 31 and its outlet 29 is mixed with flushing air 11 emanating from the guiding channel outlet 28.

The flow speeds in the guiding channel 30 and in the flushing channel 31 should be set, by way of the gap dimensions D4 and D3, such that the required values of the toilet unit are achieved as far as the cleaning effect and sound emission are concerned. The flushing-air guiding device 27 can be connected to the flushing nozzle 13 or to the toilet bowl 6 by webs. Furthermore, apart from the above-mentioned design criteria, the quantity of flushing water, the flushing water pressure, the nozzle aperture and the number of spray rings or spray nozzles are decisive in achieving an "ideal" cleaning process. In order to save weight, the quantity of flushing water used for a flushing process should be as small as possible while providing an optimum cleaning effect. With a corresponding flushing water pressure, and nozzle aperture the flushing water is mixed in small water particles of the flushing air in the flushing channel 31, and is accelerated in the flushing jet 13 or in the flushing channel 31. The small water particles can better wet and weigh down the solids, and are removed by suction at the drain 18.

Various cleaning procedures are imaginable. In one embodiment three processes are carried out. In a first step flushing water is sprayed in order to "weigh down" light matter to be transported. In a second step flushing and at the same time removal by suction by way of the vacuum system 17 takes place. In a third step removal by suction takes place without flushing water. The timing of the flushing processes and suction removal processes is to be determined according to an "ideal" cleaning process and noise emission period.

The flushing nozzle 13 and the flushing nozzle arrangement 9 with the flushing-air guiding device 27 can be designed as a ring nozzle or several connected nozzles. The flushing nozzle 13 comprises a gap that conically narrows in the direction of flow, between the toilet bowl surface 14 and the shell 5, which gap diminishes from D2 to D1. The flushing nozzle 13 and the flushing nozzle arrangement 9 with the flushing-air guiding device 27 is arranged on the upper rim 12 of the toilet bowl 6. The flow cross section in the direction of flow is selected such that the least possible flow losses are achieved, in particular turbulence is avoided. To this purpose the flow cross section can be kept constant over some regions in the direction of flow before the reduction to form the gap D1 occurs. As a result of the concentric arrangement it is therefore possible, in order to keep the flow cross section constant, to increase or decrease the gap width to the extent to which the circumference of the flow region changes.

With the use of a flushing nozzle 13 or a flushing nozzle arrangement 9 with a flushing-air guiding device 27, toilet bowl cleaning can be improved.

The vacuum toilet 1 can also be operated as a waterless toilet. It is also possible to do without the flushing-water supply unit with flushing valve 21, flushing line 20 and spray ring or spray nozzle(s) 13. The toilet bowl geometry should support gravity-driven draining of the matter to be transported on the toilet bowl surface. Furthermore, in the interior wall 14 of the toilet bowl 6 an anti-adhesive surface coating can be used to support the drainage- and transport behavior in order to further improve toilet bowl cleaning. Consequently, with the same cleaning effect it is possible to save flushing water and at the same time to save weight.

In the embodiment shown in FIG. 1 the toilet comprises a flushing nozzle 13 or a nozzle arrangement 9 and an optimal flushing air supply 33.

In the case of conventional toilets the flushing air 11 is removed by suction, behind the toilet bowl 6 by way of the toilet bowl rim 12 between the toilet bowl shell 5, the spray ring or the spray nozzle(s) 13 and the toilet-bowl interior surface 14, into the toilet bowl 6 towards the drain 18. During the rinsing process the spray ring or spray nozzle(s) 13 present flow resistance in the flushing-air stream. A turbulent flow field arises behind the flow resistance in the direction of flow.

In order to prevent this, the toilet can be designed with flow optimized shells 8. As a result of the flow-optimized shells 8 the noise level during the flushing process can be reduced, because turbulence in a flow generally generates noise emissions. Furthermore, as a result of the reduction of flow resistance an increase in the flow energy in the flushing air 11 with an improved cleaning effect on the toilet bowl surface can be achieved. In order to achieve the desired positive effects, it is possible to use a flow optimized shell 8 for the reservoir for a liquid flushing medium or for the flushing ring or flushing nozzle(s) 13 and the toilet bowl rim 12, as well as a flow optimized toilet shell 5 for feeding in and deflecting flushing air on the upper end of the toilet bowl 6 with an even gap dimension D1 to the flushing nozzle arrangement 13.

Figure 3:
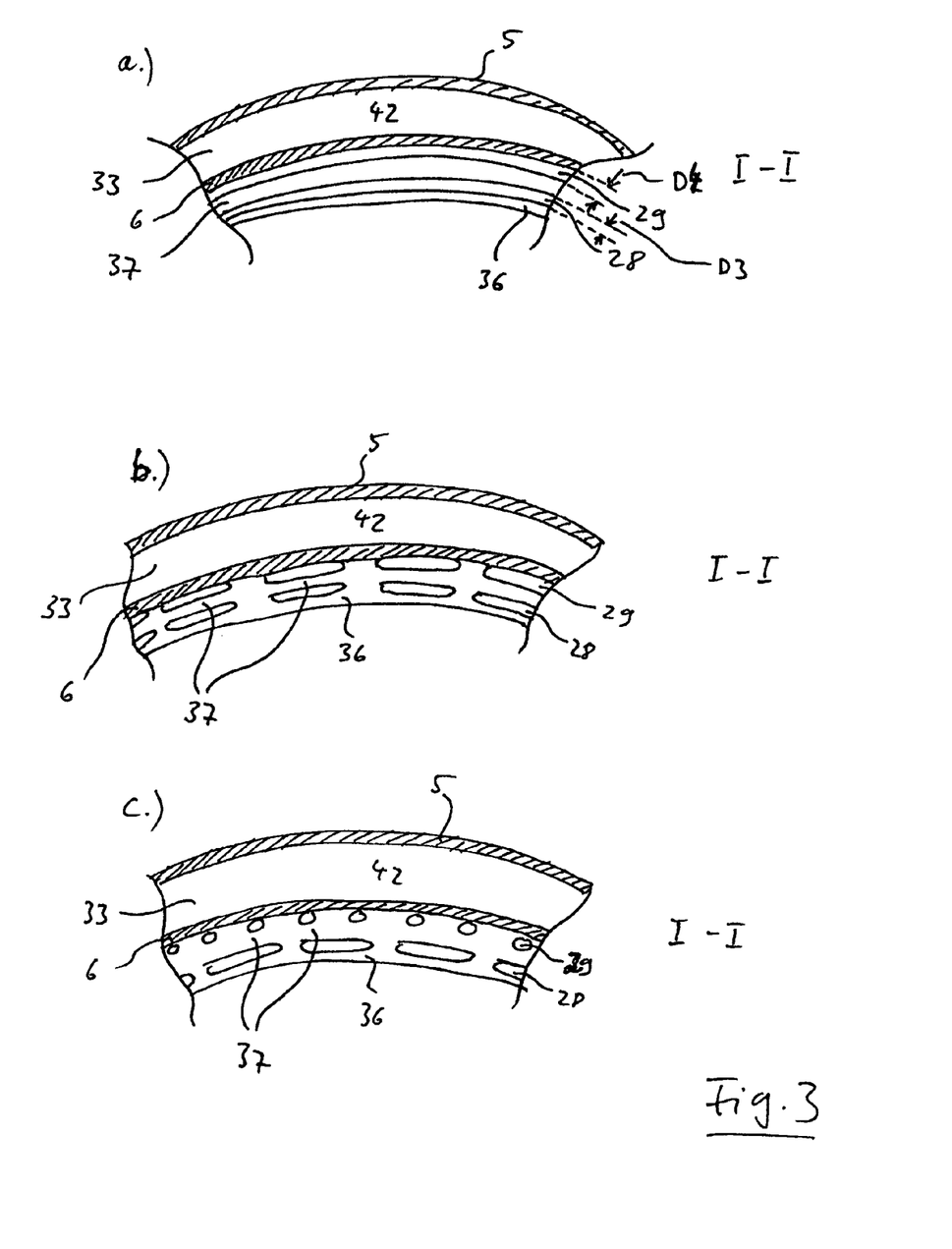
FIG. 3 shows various exemplary embodiments of nozzle outlets.

FIG. 3 shows a number of different nozzle outlet configurations. In case a, the two outlets of the flushing channel 29 and of the guiding channel 28 are designed in the form of slit nozzles or ring nozzles. Embodiment b shows the outlets of the flushing channel 29 and of the guiding channel 28 in the form of shorter slits, while embodiment c shows a combination of slit nozzles and round nozzles. However, these embodiments do not limit the possible embodiment forms; they only show a limited selection of possible nozzle arrangements.

Figure 4:
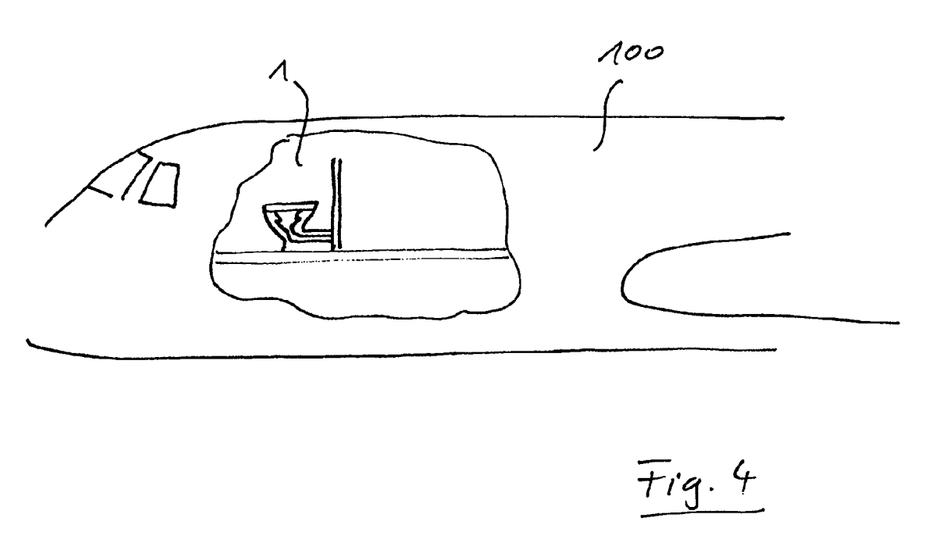
FIG. 4 shows an aircraft with an exemplary embodiment of the vacuum toilet according to the invention.

FIG. 4 shows an aircraft 100 with a vacuum toilet 1 contained therein, according to an exemplary embodiment.

Figure 5:
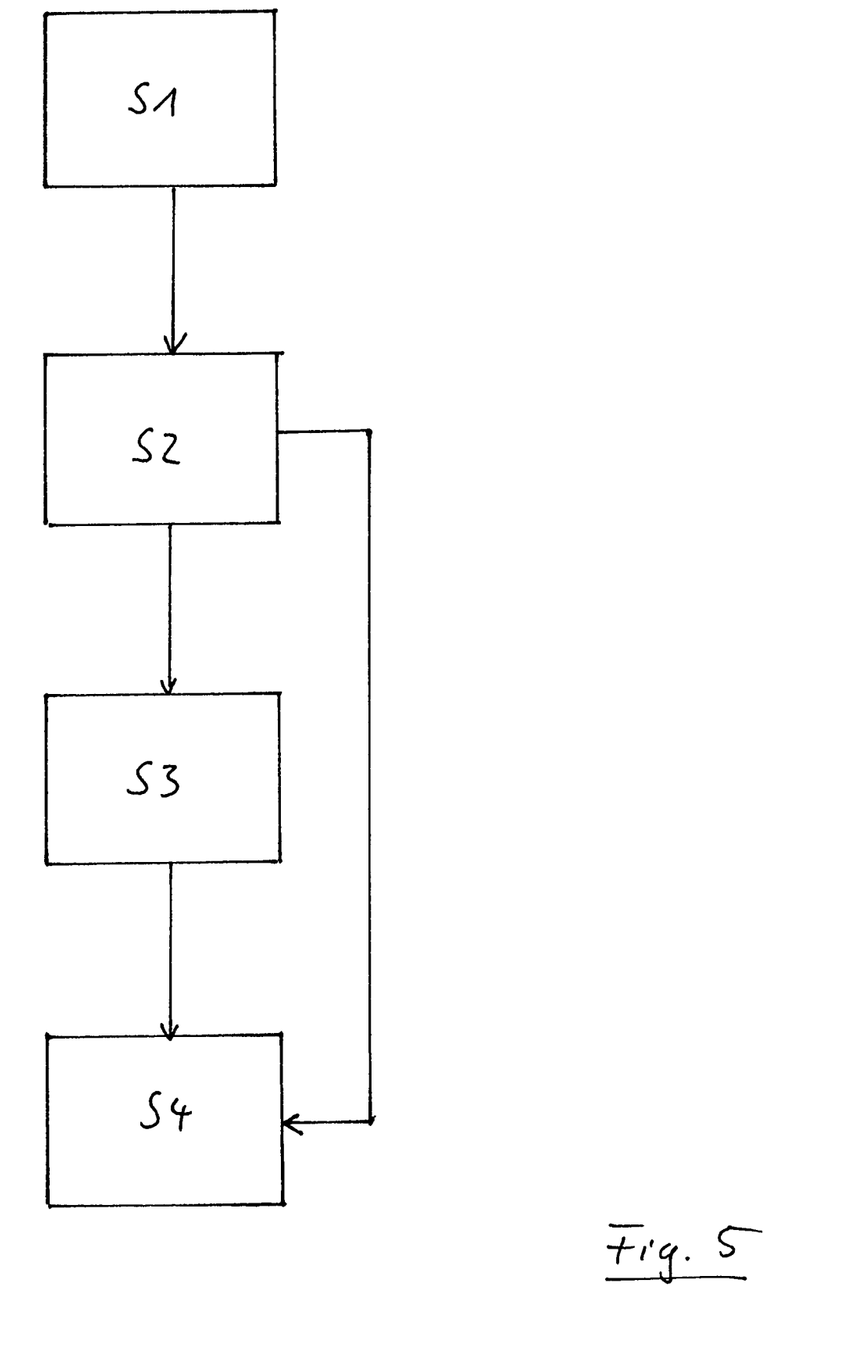
FIG. 5 shows a schematic flow chart of a method according to an exemplary embodiment of the invention.

FIG. 5 shows a schematic flow chart of a method according to an exemplary embodiment. Accordingly the method can comprise the following steps. Negative-pressure-proof sealing of a first volume after supplying a medium S1 to be disposed of, wherein after an obvious use of the vacuum toilet the cover is closed. Generating negative pressure in the first volume in order to remove by suction the medium to be disposed of and in order to generate a pressure differential between the first volume and a second volume S2. This can take place by activation of a suction device 17. Placing a flushing medium from the second volume by the negative pressure generated in the first volume by a nozzle that connects the second volume to the first volume, with a nozzle outlet that is directed into the first volume S3. In this arrangement either air or water or a mixture thereof can be used as a flushing medium. Removing by suction the medium S4 to be disposed of. The steps S2, S3 and S4 can also take place partially parallel or completely parallel. A corresponding drain will be provided correspondingly by a person skilled in the art.

Although, above, the invention has been described with reference to a preferred exemplary embodiment, various alterations and modifications can be carried out without leaving the scope of protection of the invention. The invention can also be applied to areas other than aviation, for example in trains or ships where vacuum toilets are also used and where the problem of reducing noise emission exists. Furthermore, other switch-on times can be set for the suction valve and the flushing valve, depending on the dimensioning of the vacuum toilet.

In addition, it should be pointed out that "comprising" does not exclude other elements or steps, and "a" or "an" does not exclude a plural number. Furthermore, it should be pointed out that features or steps which have been described with reference to one of the above exemplary embodiments can also be used in combination with other features or steps of other exemplary embodiments described above. Reference characters in the claims are not to be interpreted as limitations.

LIST OF REFERENCE CHARACTERS

1 Vacuum toilet
2 Toilet seat
3 Toilet lid seal
4 Reservoir for a liquid flushing medium
5 Toilet bowl shell
6 Toilet bowl
7 Surroundings of the vacuum toilet
8 Shell
9 Nozzle arrangement
10 Toilet lid
11 Gaseous flushing medium or flushing air
12 Toilet bowl rim
13 Nozzle
14 Interior wall of the toilet bowl
15 Waste water line or drain line
16 Pivot of the toilet lid
17 Vacuum system
18 Drain
19 Suction valve
20 Flushing line
21 Flush valve
22 Flushing-water supply line
23 Control unit
24 Triggering device
25 Control line, flush valve
26 Control line, suction valve
27 Guiding device
28 Guiding channel outlet
29 Flushing channel outlet
30 Guiding channel
31 Flushing channel
32 First opening of the volume
33 Air supply
34 Mixture of a gaseous and liquid flushing medium (fluids, flushing air+flushing water)
35 Liquid flushing medium or flushing water
36 Nozzle outlet
37 Separation device
41 First volume
42 Second volume
100 Aircraft Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A vacuum toilet comprising
a first volume;

a second volume; and a nozzle arrangement;

wherein the first volume comprises a first opening for supplying a medium to be disposed of, wherein the first opening can be closed off in a negative-pressure-proof manner, and a drain, to which a negative-pressure-generating device can be connected, for removing the medium to be disposed of;

wherein the second volume comprises a reservoir for a flushing medium;

wherein the nozzle arrangement includes a nozzle that comprises a nozzle outlet, wherein the nozzle arrangement connects the second volume to the first volume such that the nozzle outlet is directed to the first volume, and the flushing medium, by a pressure differential between the first volume and the second volume, through the nozzle reaches the first volume from the second volume in a directional manner, wherein the pressure differential is caused by negative pressure generated in the first volume; and wherein the first volume comprises an interior wall with a curvature that is at least in part concave, and the nozzle outlet is aligned such that the flow of the flushing medium travels laminarly along the concave curvature, and wherein the geometry of the nozzle arrangement is configured such that the hydrodynamic boundary layer on the toilet bowl is coverable by a laminar flow up to the drain.

2. The vacuum toilet of claim 1, further comprising a guiding device for guiding the flushing medium, wherein the guiding device is arranged such that the guiding device displaces the turbulence of a flow of the flushing medium away from the nozzle outlet.

3. The vacuum toilet of claim 1, wherein the second volume comprises a reservoir for a gaseous flushing medium and a reservoir for a liquid flushing medium.

4. The vacuum toilet of claim 2, wherein the guiding device is configured to guide a gaseous flushing medium around the reservoir for a liquid flushing medium.

5. The vacuum toilet of claim 3, further comprising a separation device configured to separate a gaseous flushing medium supplied from the reservoir for a gaseous medium, into a first partial quantity and a second partial quantity, wherein the liquid flushing medium is added to the first partial quantity.

6. The vacuum toilet of claim 5, wherein the first partial quantity leaves the nozzle arrangement closer to the interior wall of the first volume than does the second partial quantity.

7. The vacuum toilet of claim 2, wherein the guiding device is configured to guide the second partial quantity of a gaseous flushing medium.

8. The vacuum toilet of claim 1, wherein the second volume comprises an opening to the surroundings of the vacuum toilet.

9. The vacuum toilet of claim 1, wherein an interior wall of the first volume comprises an anti-adhesive or hydrophobic surface.

10. The vacuum toilet of claim 1, further comprising a lid movable between a first position and a second position, wherein the lid in the first position is configured to seal off the first volume in a negative-pressure-proof manner and in the second position is configured to release the first volume in order to feed in a medium to be disposed of.

11. The vacuum toilet of claim 1, wherein the nozzle is a slit nozzle that at least in part extends so as to be essentially parallel to the first opening.

12. The vacuum toilet of claim 1, further comprising a first valve configured to release the second opening to a device that generates negative pressure, a second valve configured to release a liquid flushing medium, and a control device configured to control a time sequence of controlling the first valve and the second valve.

13. A method for operating a vacuum toilet of claim 1, comprising:

Negative-pressure-proof sealing of a first volume after feeding-in a medium to be disposed of;

generating negative pressure in the first volume to remove, by suction, the medium to be disposed of, and to generate a pressure differential between the first volume and a second volume;

placing a flushing medium from the second volume, by the negative pressure generated in the first volume, into the first volume by a nozzle that connects the second volume to the first volume, with a nozzle outlet that is directed into the first volume, wherein the first volume comprises an interior wall with a curvature that is at least in part concave, and the nozzle outlet is aligned such that the flow of the flushing medium travels laminarly along the concave curvature; and removing, by suction, the medium to be disposed of;

wherein the geometry of the nozzle arrangement is configured such that the hydrodynamic boundary layer on the toilet bowl is covered by a laminar flow up to the drain.

14. An aircraft comprising a vacuum toilet, the vacuum toilet comprising:

a first volume;

a second volume; and a nozzle arrangement;

wherein the first volume comprises a first opening for supplying a medium to be disposed of, wherein the first opening can be closed off in a negative-pressure-proof manner, and a drain, to which a negative-pressure-generating device can be connected, for removing the medium to be disposed of;

wherein the second volume comprises a reservoir for a flushing medium;

wherein the nozzle arrangement includes a nozzle that comprises a nozzle outlet, wherein the nozzle arrangement connects the second volume to the first volume such that the nozzle outlet is directed to the first volume, and the flushing medium, by a pressure differential between the first volume and the second volume, through the nozzle reaches the first volume from the second volume in a directional manner, wherein the pressure differential is caused by negative pressure generated in the first volume; and wherein the first volume comprises an interior wall with a curvature that is at least in part concave, and the nozzle outlet is aligned such that the flow of the flushing medium travels laminarly along the concave curvature, and wherein the geometry of the nozzle arrangement is configured such that the hydrodynamic boundary layer on the toilet bowl is coverable by a laminar flow up to the drain.

* * * * *